Patented Oct. 1, 1946

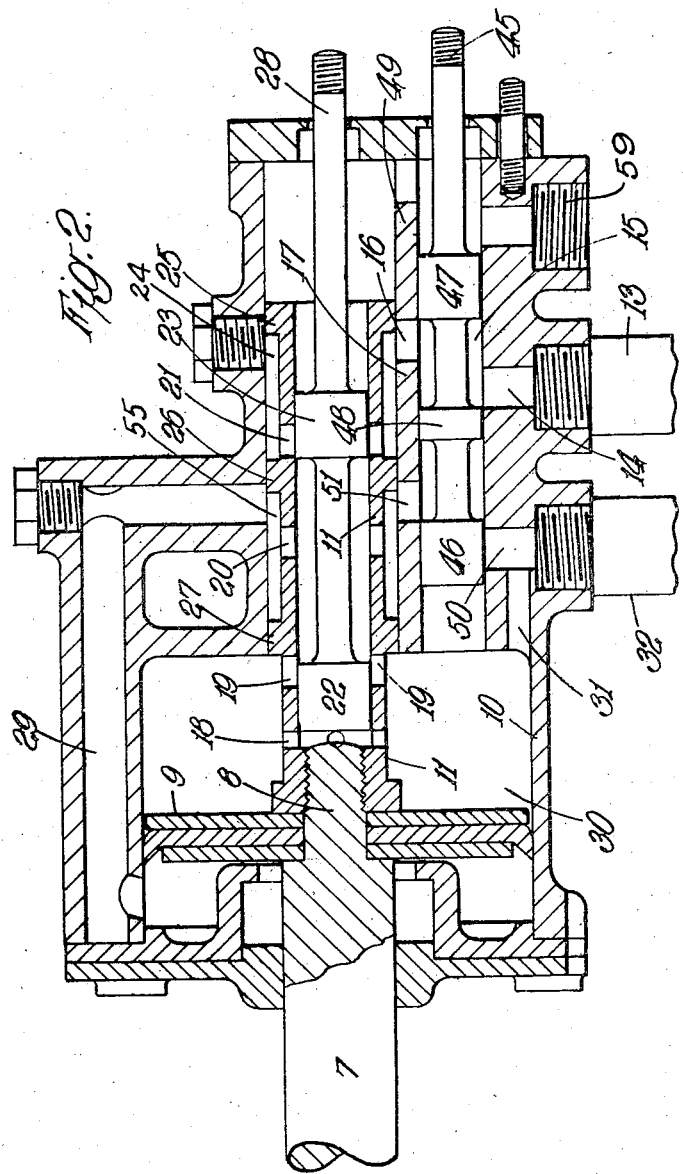

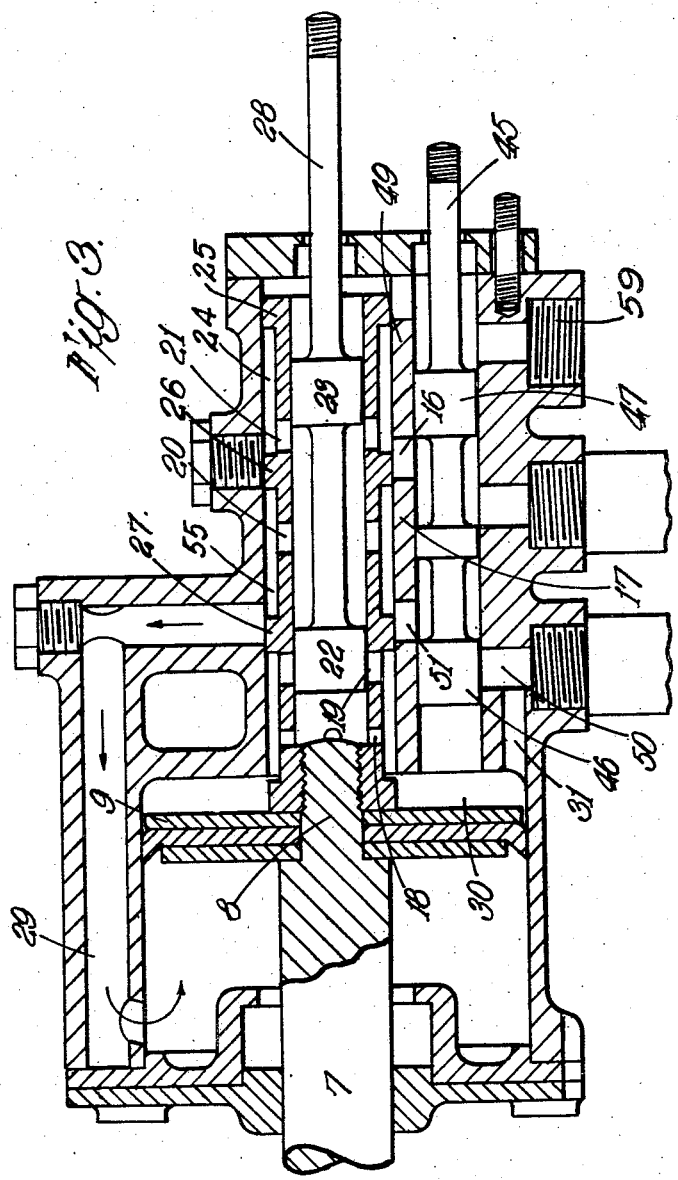

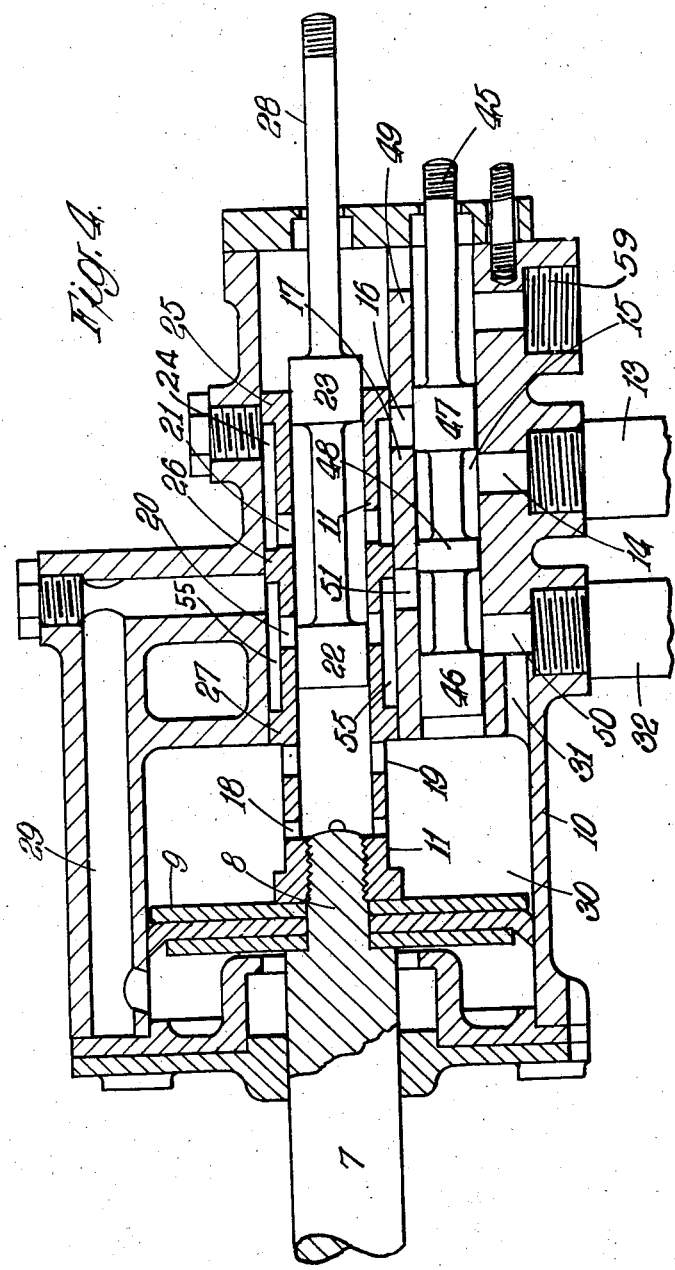

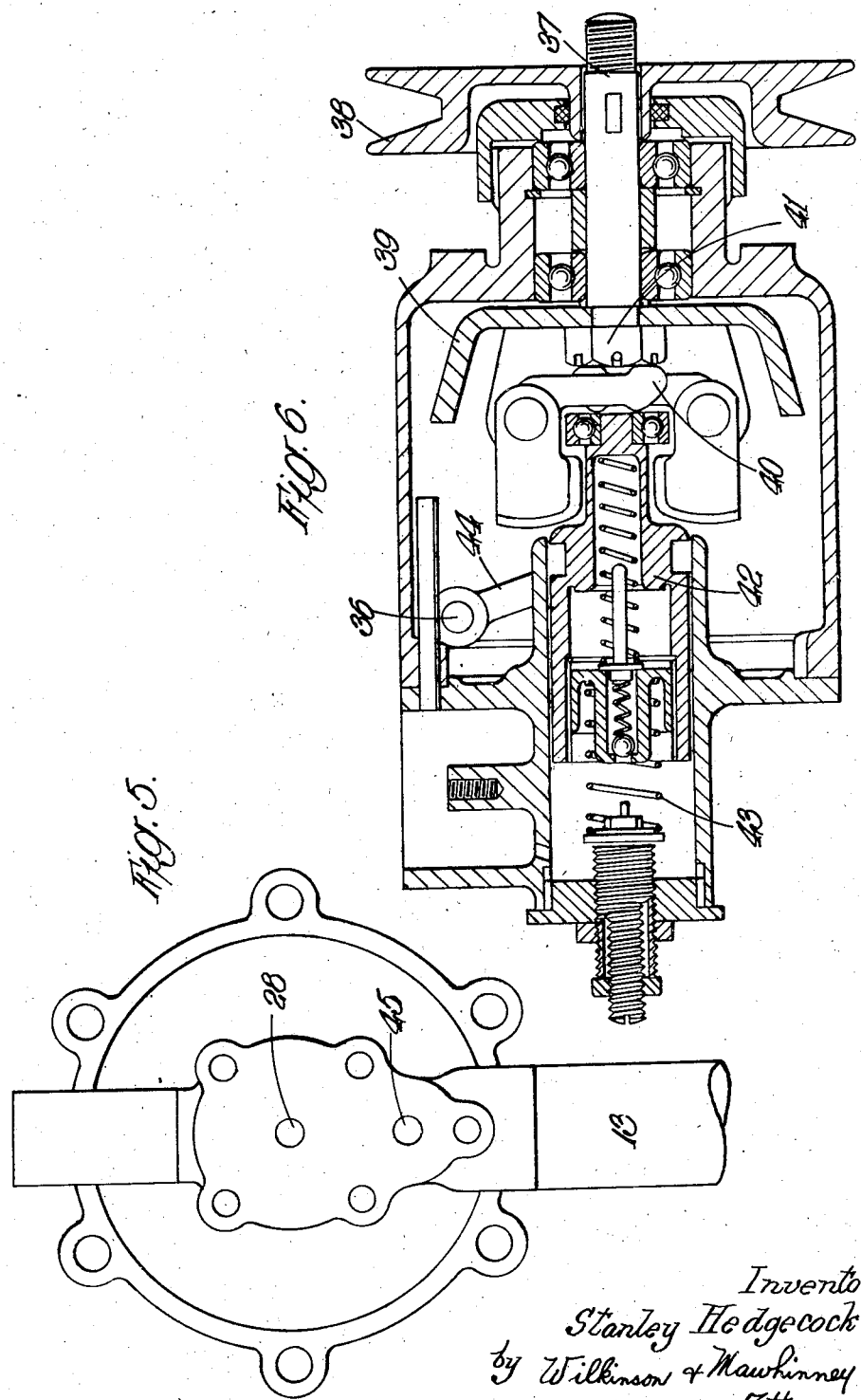

2,408,638

UNITED STATES PATENT OFFICE 2,408,638

APPARATUS FOR CONTROLLING POWER TRANSMISSION SYSTEMS

Stanley Hedgecock, Wood Green, London, England, assignor to Laystall Engineering Company Limited, London, England, a British company Application July 7, 1943, Serial No. 493,780
In Great Britain July 20, 1942

6 Claims. (Cl. 192—3.5)

This invention relates to apparatus for controlling power transmission systems that include a main power unit, a clutch and means for automatically operating the clutch progressively in accordance with the speed of the main power unit so that at low speeds the drive is not transmitted to the driven member. The invention is particularly applicable, but not limited, to automobile transmission systems in which the clutch is operated under the control of a centrifugal governor or the equivalent driven by the engine of the vehicle.

A form of apparatus that has proved successful in practice is described in the Gillett Patent No. 2,087,643. This apparatus includes a piston or other device for operating a clutch, means for delivering oil or other fluid (which may be the oil that circulates in the lubricating system of the vehicle) at a positive pressure greater than atmospheric, and a governor driven by the engine and controlling the application of the fluid pressure to the piston or other device in such a way that with the engine running the clutch is disengaged at engine speeds less than a selected speed and engaged at engine speeds exceeding that speed. In the form of apparatus described in detail in the Gillett patent, the oil or other fluid is continuously delivered to the piston or the like and a relief valve operated by the governor allows the oil to escape so that it does not actuate the piston or the like until the engine is running fast enough for the clutch to be engaged, at which time the governor closes the relief valve.

The primary object of the present invention is to simplify apparatus working on the principle described by Gillett and to render the operation more certain and positive.

Another object of the invention is to provide two units that may be fixed at convenient points in an automobile and may be interconnected to control the clutch automatically in accordance with the engine speed.

A further object of the invention is to provide a slide valve assembly operated in accordance with the engine speed to control the application of fluid under pressure to a clutch-operated device.

In the apparatus incorporating this invention the application of fluid pressure to a piston or other device for operating the clutch is directly controlled by one or more valves which serve to cut off the pressure from the piston or the like until the engine speed reaches the critical value and then to allow the pressure to be directly applied to the piston or the like progressively and to an extent dependent on the engine speed and thus to operate it positively to clutch the power unit to the driven member smoothly. Thus, in contrast to the Gillett arrangement, reliance is no longer placed upon a relief valve for allowing the fluid under pressure to escape, but instead the fluid is applied to the operating element only when that element must be operated.

The clutch may be positively connected to the piston, which is the preferred form of operating element, and the valve or valves may be moved by the governor so that when the engine speed reaches a critical value the clutch begins to engage. Thus in an automobile, as the engine is speeded up, positive pressure is applied to the piston and so brings about gradual and smooth engagement of the clutch when a previously selected speed is reached.

The fluid used may advantageously be the lubricating oil in the case of an automobile. As this is in continuous circulation so long as the engine is running, no difficulty arises from the fact that it is forced by a pump towards the piston but prevented by the valve or valves from reaching the piston until the engine attains the critical speed.

It is, of course, desirable to be able to impose manual control on any automatically-controlled apparatus of the kind in question and this may be done by providing an additional valve arranged both to cut off the fluid from the piston or the like and to relieve the pressure on the piston or the like.

The invention will be better understood by reference to the accompanying drawings which show one embodiment of it by way of example and in which:

Figures 2 and 2A are central vertical sections through a clutch-operating unit shown in Figure 1;

Figures 3 and 4 are views similar to Figure 2 with the parts in other positions;

Figure 5 is an end view looking from the right of Figure 2; and

Figure 6 is a central vertical section through a control unit shown in Figure 1.

Figure 1:
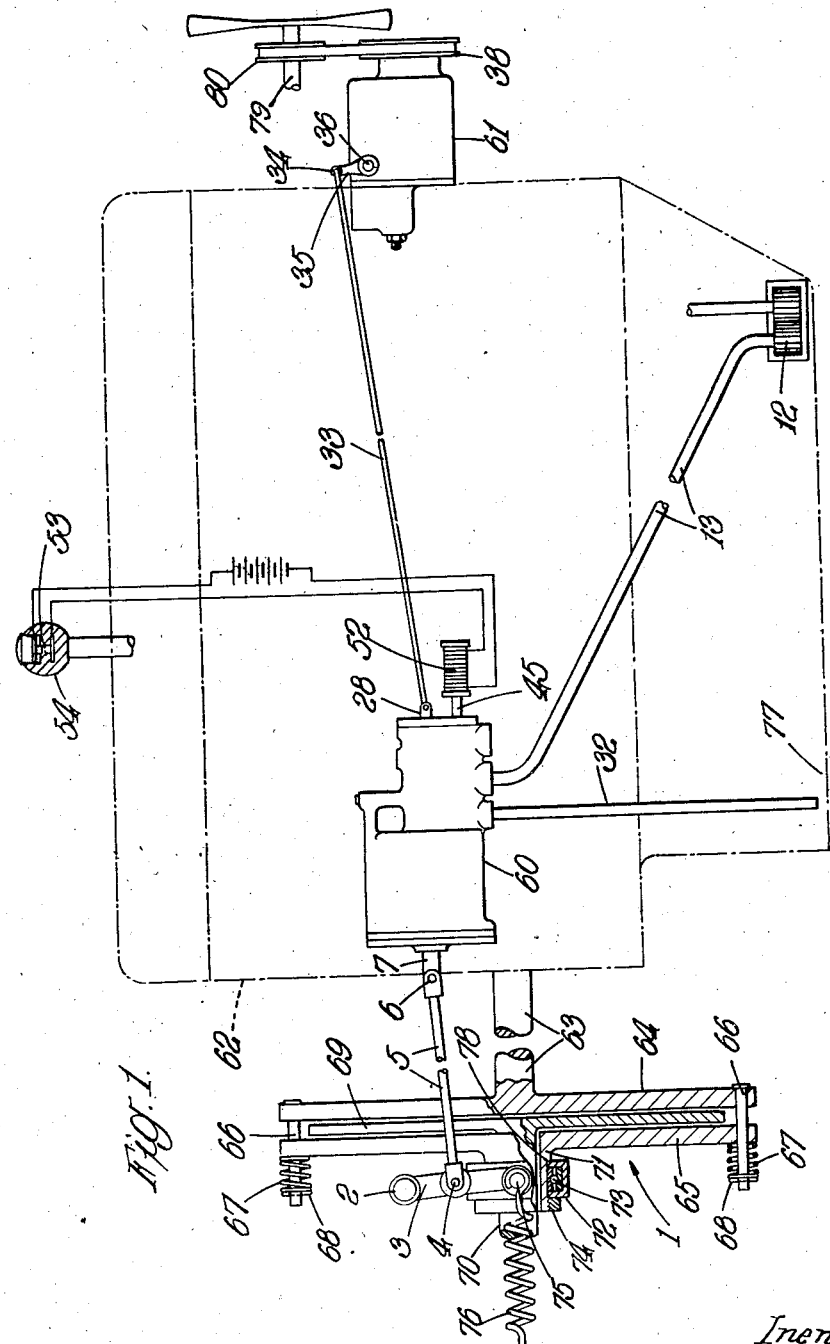
Figure 1 is a diagrammatic representation of part of an automobile having apparatus according to the invention mounted on it.

The apparatus shown comprises two interconnected units 60, 61 which are fixed in an automobile to form part of the power transmission system and to control automatically the operation of a clutch 1 in accordance with the speed of the engine indicated purely diagrammatically at 62. The engine drives a shaft 63 which carries a clutch plate 64 to which a second clutch plate 65 is connected by pins 66. Springs 67 surrounding the pins between split pins 68 and the clutch plate 65 bias the two plates together and into contact with a friction element in the form of another clutch plate 69. This plate 69 is carried by a shaft 70 which may be connected to the gear-box in the usual way. The plate 65 has a spigot or boss 71 which is surrounded by a withdrawal housing 72 containing a ball race 73 and held between a collar 74 and a shoulder 78 on the spigot 71. The housing 72 carries a pin 75 which forms an anchorage for one end of a strong spring 76 which pulls the whole withdrawal housing and the associated plates 65 to the left, as seen in Figure 1, against the action of the springs 67 so that the plates cease to be in clutching engagement with one another. To clutch in the engine a rod 5 anchored at one end to a pin 4 on a forked lever 3 is moved to the right, as seen in Figure 1. The forked lever 3 is pivotally mounted about a fixed shaft 2 and its free arms embrace the housing 72 and are pivotally anchored to it so that when the lever 3 is rocked anticlockwise by movement of the rod 5 the whole housing 72 is moved to the right and the clutch plate 69 is gripped between the plates 64 and 65.

The rod 5 is pivotally connected at 6 to an operating rod 7 which enters the unit 60, which is a clutch-operating unit. The rod 7 is formed with a reduced portion 8 which passes through a piston 9 mounted to move in a cylinder 10. A cylindrical sleeve 11 is fixed to the reduced portion 8 and serves to hold the piston 9 in position rigid with the rod 7. Thus movement of the piston 9 in the cylinder 10 operates the clutch.

The sleeve 11 forms part of a slide valve assembly that controls the application of the pressure of the lubricating oil of the automobile to the left-hand face of the piston 9. When the engine is running this oil is, of course, continuously circulated by an oil pump indicated diagrammatically at 12, and it is forced through a pipe 13 to the unit 60. Assuming that the engine is initially idling, the parts are in the position shown in Figure 2. The oil passes through a passage 14, a cylindrical space 15, and a port 16 into a cylindrical casing 17 in which the sleeve 11 slides. The sleeve is formed with four series of ports 18, 19, 20 and 21 respectively and with three flanges 25, 26 and 27 which make a close fit within the casing 17. A valve spindle 28 carrying two valves 22 and 23 slides within the sleeve and in the position shown in Figure 2 the ports 21 are closed by the valve member 23. The oil is therefore stopped from flowing further, and it simply circulates in the lubricating system in the usual way without affecting the vehicle clutch.

When the engine is speeded up the valve spindle 28 is moved to the right under the control of the engine through the action of the second unit 61, shown in Figure 6. The spindle 28 is connected by a link 33 and a cross rod 34 to a link 35. This link is carried rigidly by a shaft 36 which passes horizontally through the unit shown in Figure 6. This unit includes a shaft 37 which is driven from the fan shaft 79 of the engine cooling system through pulleys 38 and 80 and it carries a cylindrical governor 39, the weights of which have cranked arms 40 which, when the governor is stationary or only running slowly, bear on an abutment 41 rigid with the shaft 37. When the engine speed increases the arms 40 bear on the end of a piston 42 and move it to the left (as seen in Figure 6) against the action of a spring 43. This piston is connected by a pin and slot to the lower end of a link 44 which is rigid with the shaft 36. Thus, as the engine speed increases, the link 44 is rocked in consequence of the movement of the piston 42 and in turn through the link mechanism 33, 34 and 35 the valve spindle 28 is moved to the right into a position such as that shown in Figure 2A, the exact position depending on the engine speed.

Figure 2A:
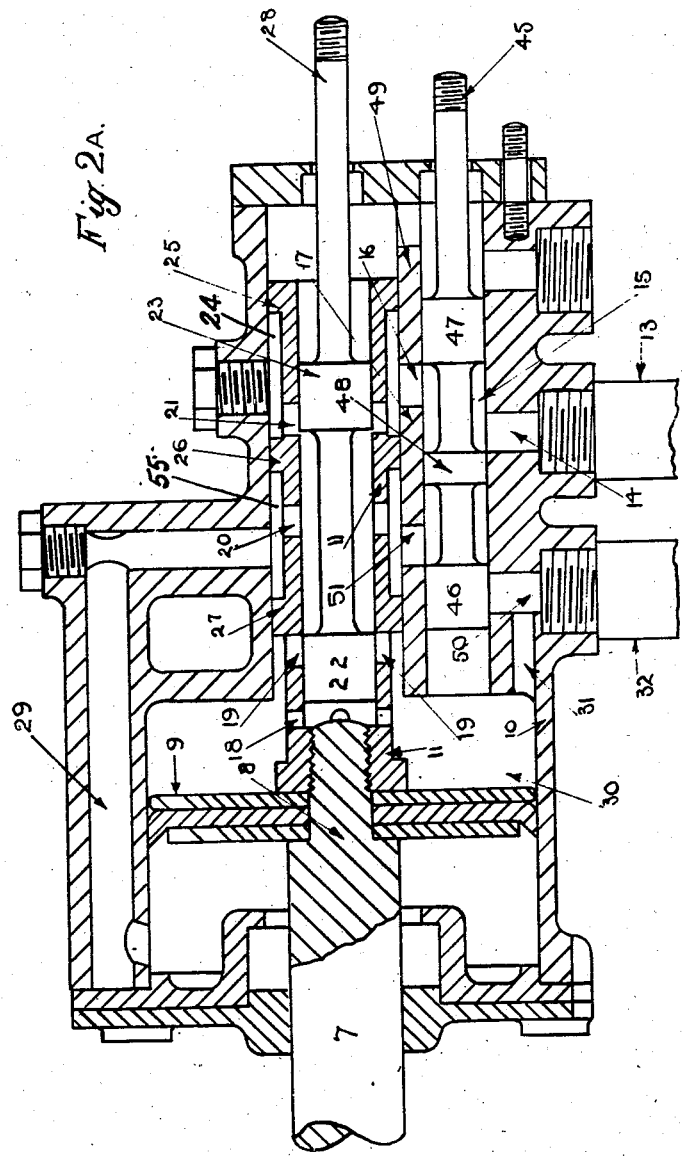

Initially the ports 21 are partly opened by the valve member 23 and the ports 19 closed, as shown in Figure 2A, and the oil is able to flow from the casing 17 through these ports 21 into the space between the valve members 22 and 23 and through the ports 20 into another space 24 between the flanges 25 and 26. From this, the oil flows through a passage 29 to the left-hand face of the piston 9 as indicated by arrows in Figure 3. The piston 9 is thereupon forced to the right and the clutch begins to engage. As the piston 9 moves to the right the sleeve 11 will move to the right also, and the ports 21 will overtake the valve 23 and so cut off the pressure. If the piston 9 should move too far, the ports 21 will be closed, thus cutting off the pressure line 13 from the cylinder space at the left hand side of the piston 9, and the ports 19 will be opened slightly and vent the left hand side of the piston 9 to the sump via the passage 31, as explained in the next paragraph, so that the pressure on the left hand face of the piston will be relieved and any tendency of the clutch to "snatch" will thus be overcome. On further movement of the valve spindle 28 to the right as the engine speed increases, the ports 21 will again be opened to admit more oil to the left-hand face of the piston 9 until the position shown in Figure 3 is reached, in which the clutch is fully engaged. This is the normal position when the automobile is running.

When the driver wishes to stop the vehicle, he reduces the engine speed with the result that the valve spindle 28 is moved back to the position shown in Figure 2 through the position shown in Figure 2A. This automatically cuts off the oil at the ports 21, as they are now closed again by the valve member 23, so that the oil pressure is no longer applied to the left-hand face of the piston 9. At the same time, the valve member 22 which had closed the ports 19 completely in the position shown in Figure 3 uncovers these ports so that the pressure in the passage 29 and on the left-hand face of the piston 9 is relieved, since the oil can flow out of the passage 29 through the ports 20, around the valve spindle 28 and through the ports 19 into the space 30 on the right-hand side of the piston 9. This space is in permanent connection by way of a passage 31 with a pipe 32 leading to the oil sump 77.

The unit 60 contains an additional valve for manual control. This is also a slide valve and it consists of a spindle 45 carrying two slide valve members 46 and 47 with a piston 48 between them and working in a ported casing 49. In normal running this manually-operated valve is in the position shown in Figures 2 and 3 and is substantially inoperative. If, however, the valve spindle 45 is moved to the left into the position shown in Figure 4, the valve member 47 will close the port 16, thus shutting off the supply of oil from the remainder of the unit. At the same time the valve member 46 will uncover a passage 50 and so allow oil in the passage 29 or between the valve members 22 and 23 to escape through a space 55, between the flanges 26 and 27, a port 51 in the casing 49, and the space between the valve member 46 and the piston 48 into the pipe 32. Accordingly the engine is declutched whenever the valve spindle 45 is moved into the position shown in Figure 4.

The valve spindle 45 is operated by a solenoid 52 placed in a circuit containing a pair of contacts 53 mounted on the gear lever, shown diagrammatically at 54, so that whenever the driver puts his hand on the gear lever preparatory to changing gear, the engine is declutched.

To avoid hydraulic locking of the valves 22, 23, 11, etc., and 46, 47, 48, and to ensure that these valves are in themselves pressure-balanced, the space at the right-hand end of the valve body is vented through the opening 59 which may conveniently be connected to the sump 77 by means of a pipe (not shown) similar to pipe 32.

It is to be understood that although the invention is particularly applicable to apparatus for use in automobiles it can be applied to any other power transmission system which incorporates a clutch, e. g. power transmission systems in ships, compressors, cranes or other machines and in which it is undesirable to transmit the drive to the driven member at low speeds.

What I claim is:

1. In a power transmission system, a power unit, a rotary element driven thereby, an element adapted to engage said rotary element frictionally, pressure-actuated means including a piston for operating said engaging element, means for continuously forcing fluid under pressure to said piston, a slide valve assembly interposed between said fluid-forcing means and said piston for controlling the application of fluid pressure to said piston, said assembly comprising a casing, a ported sleeve slidable in said casing and fixed to said piston and a valve rod, and means responsive to the speed of said power unit and operatively connected to said valve rod for actuating said assembly to cut off the pressure from operating means below a predetermined speed of said power unit and to allow the pressure to be directly applied to said piston on said predetermined speed being exceeded.

2. In a power transmission system including a power unit and a clutch, in combination, means for delivering fluid under pressure, pressure-actuated clutch-operating means having a connection to said pressure fluid delivery means and a fluid exhausting connection and comprising a movable clutch-engaging power element, valve means controlling the admission and release of fluid to and from the power element, and valve operating means responsive to the speed of the power unit, said valve means comprising two mutually-cooperative valve members, of which one is connected to the speed responsive means, being displaceable thereby in accordance with speed variations of the power unit, for admitting pressure fluid to the power element to move the clutch towards engaged position, when the power-unit speed exceeds a critical value, and for cutting-off the pressure fluid from the power element at speeds below the critical speed, and the other (valve member) is connected to the power element for movement thereby so as to constitute with the first-mentioned valve member a "follow-up" valve assembly operative to cause the power element to follow the displacements of the first-mentioned valve member and ensure progressive engagement of the clutch as speed is increased above the critical speed.

3. In a power transmission system including a power unit and a clutch, the combination claimed in claim 2 including also manually controllable valve means for interrupting the admission of pressure fluid to the power element and at the same time releasing back pressure on said power unit by establishing a connection to the fluid exhausting connection.

4. In a power transmission system including a power unit and a clutch, in combination, means for delivering fluid under pressure, a pressure-actuated clutch-operating unit having a connection to said pressure fluid delivery means and a fluid exhausting connection and comprising a movable clutch-engaging power element and valve means controlling the admission and release of fluid to and from the power element, said valve means comprising two mutually cooperative valve members, and a separate valve-operating unit including centrifugal means driven by the power unit, means external to the clutch-operating and valve-operating units interconnecting the centrifugal means of the latter unit with one of the valve members of the former unit for displacing said last-named valve member in accordance with speed variations of the power unit for admitting pressure fluid to the power element to move the clutch towards engaged position, when the power-unit speed exceeds a critical value, and for cutting-off the pressure fluid from the power element at speeds below the critical speed, the other valve member of the clutch-operating unit being connected to the power element for movement thereby, so as to constitute with the first-mentioned valve member a "follow-up" valve assembly operative to cause the power element to follow the displacements of the first-mentioned valve member and ensure progressive engagement of the clutch as speed is increased above the critical speed.

5. In a power transmission system including a power unit and a clutch, in combination, a pressure fluid circuit including a pump driven by the power unit, pressure-actuated clutch-operating means having pressure and drain connections to said fluid circuit and comprising a movable clutch-engaging piston, a slide-valve member connected to said piston for movement therewith and a second slide-valve member, speed responsive valve-operating means including a centrifugal element driven by the power unit and a connection between said valve-operating means and the second slide-valve member for displacing the latter in accordance with power-unit speed variations for admitting pressure fluid to the piston to move the latter towards clutch-engaging position, when the speed exceeds a critical value and for cutting-off pressure fluid from the piston at speeds below the critical speed, the two slide-valve members cooperating mutually to constitute a follow-up valve assembly operative to cause the piston to follow the displacements of the second slide-valve member and ensure progressive clutch-engagement as speed is increased above the critical speed.

6. In a power transmission system including a power unit and a clutch, the combination claimed in claim 5 including an additional manually operated slide valve for simultaneously cutting-off the pressure connection and opening the drain connection of the clutch-operating means to the fluid circuit.

STANLEY HEDGECOCK.